(12) United States Patent
Dias et al.

(10) Patent No.: US 7,491,764 B2
(45) Date of Patent: Feb. 17, 2009

(54) LOW PERMEABILITY NANOCOMPOSITES

(75) Inventors: Anthony Jay Dias, Houston, TX (US);
Andy Haishung Tsou, Houston, TX (US); David Yen-Lung Chung, Bellaire, TX (US); Weiqing Weng, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 236 days.

(21) Appl. No.: 10/478,606

(22) PCT Filed: May 29, 2002

(86) PCT No.: PCT/US02/16797

§ 371 (c)(1),
(2), (4) Date: Nov. 20, 2003

(87) PCT Pub. No.: WO02/100936

PCT Pub. Date: Dec. 19, 2002

(65) Prior Publication Data

US 2005/0027058 A1 Feb. 3, 2005

Related U.S. Application Data

(60) Provisional application No. 60/297,915, filed on Jun. 13, 2001.

(51) Int. Cl.
*C08K 5/01* (2006.01)
(52) U.S. Cl. .................. 524/445; 524/186; 524/447
(58) Field of Classification Search ................ 524/445, 524/186, 447; 523/200, 216; 501/145
See application file for complete search history.

(56) References Cited

U.S. PATENT DOCUMENTS

| | | | | |
|---|---|---|---|---|
| 3,516,959 A * | 6/1970 | Jonas | ............... | 524/140 |
| 4,129,629 A * | 12/1978 | Gordon | ............... | 523/340 |
| 4,256,857 A | 3/1981 | Buckler et al. | ............... | 525/331 |
| 4,417,012 A * | 11/1983 | Moniotte | ............... | 524/83 |
| 5,013,793 A | 5/1991 | Wang et al. | ............... | 525/195 |
| 5,021,500 A | 6/1991 | Puydak et al. | ............... | 524/525 |
| 5,051,477 A | 9/1991 | Yu et al. | ............... | 525/194 |
| 5,051,478 A | 9/1991 | Puydak et al. | ............... | 525/195 |
| 5,162,445 A | 11/1992 | Powers et al. | ............... | 525/333.4 |
| 5,246,778 A | 9/1993 | Costemalle et al. | ............... | 428/398 |
| 5,461,118 A | 10/1995 | Arjunan et al. | ............... | 525/333.5 |
| 5,552,469 A | 9/1996 | Beall et al. | ............... | 524/445 |
| 5,569,716 A | 10/1996 | Okamoto et al. | ............... | 525/192 |
| 5,576,372 A | 11/1996 | Kresge et al. | ............... | 524/442 |
| 5,576,373 A | 11/1996 | Kresge et al. | ............... | 524/445 |
| 5,633,321 A | 5/1997 | Arjunan | ............... | 525/197 |
| 5,665,183 A | 9/1997 | Kresge et al. | ............... | 152/204 |
| 5,747,560 A | 5/1998 | Christiani et al. | ............... | 523/209 |
| 5,807,629 A | 9/1998 | Elspass et al. | ............... | 428/323 |
| 5,824,717 A | 10/1998 | Merrill et al. | ............... | 522/81 |
| 5,883,173 A | 3/1999 | Elspass et al. | ............... | 524/446 |
| 5,885,173 A | 3/1999 | Keller | ............... | 473/385 |
| 5,912,302 A | 6/1999 | Gadkari et al. | ............... | 525/127 |
| 5,936,023 A | 8/1999 | Kato et al. | ............... | 524/445 |
| 5,952,093 A | 9/1999 | Nichols et al. | ............... | 428/323 |
| 5,973,053 A | 10/1999 | Usuki et al. | ............... | 524/445 |
| 6,011,120 A | 1/2000 | Frechét et al. | ............... | 525/288 |
| 6,034,164 A | 3/2000 | Elspass et al. | ............... | 524/445 |
| 6,036,765 A | 3/2000 | Farrow et al. | ............... | 106/487 |
| 6,060,549 A | 5/2000 | Li et al. | ............... | 524/445 |
| 6,060,563 A | 5/2000 | Peiffer et al. | ............... | 525/213 |
| 6,087,016 A | 7/2000 | Feeney et al. | ............... | 428/454 |
| 6,103,817 A | 8/2000 | Usuki et al. | ............... | 524/574 |
| 6,117,932 A | 9/2000 | Hasegawa et al. | ............... | 524/445 |
| 6,133,364 A | 10/2000 | Obrecht et al. | ............... | 524/495 |
| 6,136,923 A | 10/2000 | Cheung et al. | | |
| 6,201,054 B1 | 3/2001 | Hara et al. | ............... | 524/492 |
| 6,207,757 B1 | 3/2001 | Obrecht et al. | ............... | 525/194 |
| 6,225,394 B1 | 5/2001 | Lan et al. | | |
| 6,232,389 B1 * | 5/2001 | Feeney et al. | ............... | 524/450 |
| 6,626,219 B2 * | 9/2003 | Tracey et al. | ............... | 152/511 |
| 6,825,281 B2 * | 11/2004 | Tse et al. | ............... | 525/241 |
| 7,329,697 B2 * | 2/2008 | Waddell et al. | ............... | 524/47 |
| 2005/0032937 A1 * | 2/2005 | Tsou et al. | ............... | 523/216 |

FOREIGN PATENT DOCUMENTS

DE 38 06 548 9/1988

(Continued)

OTHER PUBLICATIONS

Material Data Sheet for "Cloisite 25A".2MHTL8: dimethyl, hydrogenatedtallow, 2-ethylhexyl quaternary ammonium [online]. Southern Clay Products, Inc (SCP). [retrieved on Jan. 13, 2006]. Retrieved from <URL: http://www.nanoclay.com/data/25A.htm>.*
Lewis, Richard J., Sr. (2002). Hawley's Condensed Chemical Dictionary (14th Edition). John Wiley & Sons. Definition of "Amine".*
T. Wang et al.—"Functional Polymers for Colloidal Applications. XIV. Syntheses of Styrene-Maleic Anhydride Copolymers with Different Charges and Their Ability to Disperse Kaolinite Particles" Journal of Applied Polymer Science, vol. 78, 592-602 (2000).
M. Ko et al.—"Effects of the Interaction between Intercalant and Matrix Polymer in Preparation of Clay-dispersed Nanocomposites" Korea Polymer Journal, vol. 8, No. 3, pp. 120-124 (2000), Korea.
Paterra Translation for JP 2000-129072-Japan (see line BC), published May 9, 2000, entitled "Rubber-Containing Graft Copolymer Composition and Manufacturing Method".

(Continued)

*Primary Examiner*—Katarzyna Wyrozebski
(74) *Attorney, Agent, or Firm*—Nancy T. Krawczyk; Xiaobing Feng; Kevin M. Faulkner

(57) ABSTRACT

The present invention includes blends of a halogenated elastomer such as a butyl rubber or an interpolymer of, on one embodiment, a $C_4$ to $C_7$ isomonoolefin, a para-methylstyrene and a para-(halomethylstyrene), the interpolymer having been pre-mixed with an exfoliating compound and clay, the entire blend forming a nanocomposite in one embodiment. The clay may or may not have undergone an additional exfoliating treatment prior to blending with the halogenated elastomer. The interpolymer/clay mixture forms a distinct phase in the nanocomposite blend of the invention. The blend of the invention has improved air barrier properties and is suitable as an air barrier.

56 Claims, No Drawings

FOREIGN PATENT DOCUMENTS

| | | |
|---|---|---|
| DE | 38 10 006 | 10/1988 |
| DE | 198 42 845 | 4/1999 |
| DE | 100 14 664 | 9/2001 |
| EP | 0 325 997 | 8/1989 |
| EP | 0722850 | 7/1996 |
| EP | 0 747 451 | 12/1996 |
| EP | 0 822 163 | 2/1998 |
| EP | 0 915 124 | 5/1999 |
| EP | 0969039 | 1/2000 |
| EP | 1 029 823 * | 8/2000 |
| EP | 1 038 834 | 9/2000 |
| EP | 0 747 322 | 9/2001 |
| EP | 1 145 871 | 10/2001 |
| JP | 2000-129072 | 5/2000 |
| JP | 2000-159960 | 6/2000 |
| JP | 2000-160024 | 6/2000 |
| SU | 1973-1953933 | 3/1975 |
| WO | WO 9118050 | 11/1991 |
| WO | WO 9304117 | 3/1993 |
| WO | WO 9304118 | 3/1993 |
| WO | WO 9325620 | 12/1993 |
| WO | WO 94/10214 | 5/1994 |
| WO | WO 94/22680 | 10/1994 |
| WO | WO 9700910 | 1/1997 |
| WO | WO 9714748 | 4/1997 |
| WO | WO 98/05713 | 2/1998 |
| WO | WO 9853000 | 11/1998 |
| WO | WO 9910276 | 3/1999 |
| WO | WO 0009605 | 2/2000 |
| WO | WO 00/34393 | 6/2000 |
| WO | WO 0037553 | 6/2000 |
| WO | WO 0069957 | 11/2000 |
| WO | WO 00/78540 * | 12/2000 |
| WO | WO 0168760 | 9/2001 |
| WO | WO 0209823 | 2/2002 |
| WO | WO 0224757 | 3/2002 |
| WO | WO 02/31048 | 4/2002 |
| WO | WO 02/100935 | 12/2002 |

OTHER PUBLICATIONS

Paterra Translation for JP 2000-159960-Japan (see line BD), published Jun. 13, 2000, entitled "Styrenic Thermoplastic Elastomer Composition and Manufacturing Method".

Abstract for RD 404074, published Dec. 10, 1997, entitled "Brominated Isobutylene Para-Methylstyrene (BIMS)-Based Compound Offer Outstanding Heat-Aging and Compression Set Performance".

Abstract for SU 464563-Russia (see line BE), published Mar. 25, 1975, entitled "Clay Disperser".

Abstract for DE 100 14 664 (see line AQ)-Germany, published Sep. 27, 2001, entitled "Preparation of Sulfur-Crosslinkable Rubber Mixtures and Production of Articles from These Mixtures".

Abstract for DE 198 42 845 (see line AR)-Germany, published Apr. 1, 1999, entitled "Preparation of Sulfur-Crosslinkable Rubber Mixtures and Production of Articles from These Mixtures".

Abstract for DE 38 06 548 (see line AS)-Germany, published Sep. 15, 1988, entitled "Manufacture of Plastic Composites with Layered Silicates".

Abstract for DE 38 10 006 (see line AT)-Germany, published Oct. 6, 1988, entitled "Manufacture of Filled Polymers".

Abstract for EP 0 325 997 (see line AQ), published Aug. 2, 1989, entitled "Copolymers of Isobutylene and Chloro-Acetylated or Alkylaminoacylated Styrenes, Their Manufacture and Their Use in the Preparation of Polyurethanes, Epoxy Resins or Crosslinked Polymer Compositions".

M. Alexandre et al., "Polymer-Layered Silicate Nanocomposites: Preparation, Properties and Uses of a New Class of Materials", Materials Science and Engineering R: Reports, Elsevier Sequoia S.A., Lausanne, Materials Science and Engineering, vol. 28, (2000), pp. 1-63, Belgium.

Messersmith et al., "Synthesis and Barrier Properties of Poly($\epsilon$-Caprolactone)-Layered Silicate Nanocomposites", Journal of Polymer Science: Part A: Polymer Chemistry, vol. 33, pp. 1047-1057, 1995, Chicago, IL.

* cited by examiner

LOW PERMEABILITY NANOCOMPOSITES

CROSS REFERENCE TO RELATED APPLICATIONS

This application is a National Stage Application of International Application No. PCT/US02/16797, filed May 29, 2002, which claims the benefit of Provisional Application No. 60/297,915, filed Jun. 13, 2001.

FIELD OF THE INVENTION

The present invention provides a low-permeability nanocomposite useful for air barriers which is a blend of an elastomer, vulcanized or unvulcanized, a nano-filler such as a clay, and an exfoliating additive including long-chain tertiary amines.

BACKGROUND

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. A common type of inorganic particle used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire to have a nanocomposite with low air permeability; especially a dynamically vulcanized thermoplastic nanocomposite such as used in the manufacture of tires.

The preparation of elastomer-clay nanocomposites uses a number of methods to generate exfoliated clays. One of the most common methods relies upon the use of organically modified montmorillonite clays. Organoclays are produced through solution based ion-exchange reactions that replace sodium ions that exist on the surface of sodium montmorillonite with alkyl or aryl ammonium compounds. One of the deficiencies of this method is the limited thermal stability of the amines. A second is the lack of chemical bonding with the matrix, often leading to poor mechanical properties and increased hysteresis. A third is the negative impact that the release amines and degradation products have on the transport properties.

One method to improve the organoclay performance is to use functionalized polymers to treat the clay. This approach has been limited to materials that are soluble in water or to materials that can be incorporated into the polymerization reaction. This approach has been used to prepare nylon nanocomposites, using for example, oligomeric and monomeric caprolactam as the modifier. Polyolefin nanocomposites have utilized maleic anhydride grafted polyolefins to achieve some success in the formation of nanocomposites.

For example, it is known to utilize exfoliated-clay filled nylon as a high impact plastic matrix, such as disclosed in U.S. Pat. No. 6,060,549 to Li et al. In particular, Li et al. disclose a blend of a thermoplastic resin such as nylon and a copolymer of a $C_4$ to $C_7$ isomonoolefin and a para-methylstyrene and a para-(halomethylstyrene), the blend also including nylon containing exfoliated-clays that are used as a high impact material. Further, Japanese Unexamined Application P2000-160024 to Yuichi et al. discloses a thermoplastic elastomer composition which can be used as an air barrier. The nanocomposite in Yuichi et al. includes is blend similar to that disclosed in Li et al.

Nanocomposites have also been formed using brominated copolymers of isobutylene and para-methylstyrene. See, for example, Elspass et. al., U.S. Pat. Nos. 5,807,629, 5,883,173, and 6,034,164. It has been found that the efficiency of clay exfoliation is increased by increasing bromination level. Unfortunately these copolymers are very reactive and it is difficult to achieve high levels of functionalization without undue added vulcanization. Optimal performance in many applications requires the minimum level of vulcanization that yields acceptable physical properties, in that way aging and durability are maximized.

Thus, there is still a problem of achieving a nanocomposite suitable for an air barrier, in particular, an air barrier incorporating the copolymer (or "interpolymer") of a $C_4$ to $C_7$ isomonoolefin and a para-methylstyrene and a para-(halomethylstyrene). While enhancing the impact properties and abrasion resistance of plastics such as polyamides, this copolymer tends to be a poor air barrier as compared with that of polyamide alone or other low-permeability plastic matrices. What is needed is an exfoliated nanocomposite of a halogenated copolymer of a $C_4$ to $C_7$ isomonoolefin, a para-methylstyrene and a para-(halomethylstyrene).

SUMMARY OF THE INVENTION

An embodiment of the present invention includes a nanocomposite including halogenated elastomers such as, for example, interpolymers of $C_4$ to $C_7$ isomonoolefin, a para-methylstyrene and a para-(halomethylstyrene) that have low levels of reactive bromide but which are activated toward the formation of an exfoliated nanocomposite through the addition of a functionalized additive. Alternately the copolymer may be selected with higher levels of bromination and then some fraction of these sites are complexed with the additive thereby reducing their reactivity in vulcanization. In another embodiment, the nanocomposite includes halogenated elastomers comprising $C_4$ to $C_7$ isoolefin derived units, multiolefin derived units, and halogenated multiolefin derived units, or "halogenated butyl" rubber. The additive should be capable of reaction with the halogen sites on the polymer to form complexes which help exfoliate the clay. The clay may be exfoliated prior to mixing with the interpolymer in one embodiment, and ion exchanged with a counterion in another embodiment.

An embodiment of the invention includes a nanocomposite useful for air barriers which includes a clay, an interpolymer or halogenated butyl rubber, an exfoliating additive, and optionally a polyfunctional curative, the exfoliating agent being an amine having the structure $R^2R^3R^4N$, wherein $R^2$, $R^3$, and $R^4$ are $C_1$ to $C_{20}$ alkyls or alkenes which may be the same or different. The interpolymer is a copolymer of $C_4$ to $C_7$ isomonoolefin derived units, a para-methylstyrene derived units and a para-(halomethylstyrene) derived units, wherein the para-(halomethylstyrene) derived units are present from 0.4 to 1 mol % in the interpolymer. In one embodiment, the amine is a tertiary amine, and at least $R_1$ is a $C_{14}$ to $C_{20}$ alkyl or alkene. The exfoliating agent may be selected from the group consisting of N,N-dimethyl-octadecylamine, N,N-dioctadecyl-methylamine, dihydrogenated tallowalkyl-methylamine, amine-terminated polytetrahydrofuran and mixtures thereof. Further, the exfoliating agent may be a thiosulfate compound such as hexamethylene sodium thiosulfate. The nanocomposite may also include a filler such as carbon black. The clay can be untreated sodium montmorillonite or a traditional organically modified clay.

DETAILED DESCRIPTION OF THE INVENTION

The present invention includes nanocomposite compositions of halogenated elastomers and clays treated with one or more exfoliating additives. The invention is not herein limited to the order of addition of the components. The halogenated elastomer may be an interpolymer comprises $C_4$ to $C_7$ isoolefin derived units, para-methylstyrene derived units and a para-(halomethylstyrene) derived units in one embodiment, and comprises $C_4$ to $C_7$ isoolefin derived units, multiolefin derived units, and halogenated multiolefin derived units in another embodiment. The nanocomposite can also include other cross-linking agents, thermoplastics, and secondary rubbers or "general purpose rubbers" as described herein.

Halogenated Elastomer

The interpolymers in one embodiment of the invention are random elastomeric copolymers of a $C_4$ to $C_7$ isomonoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

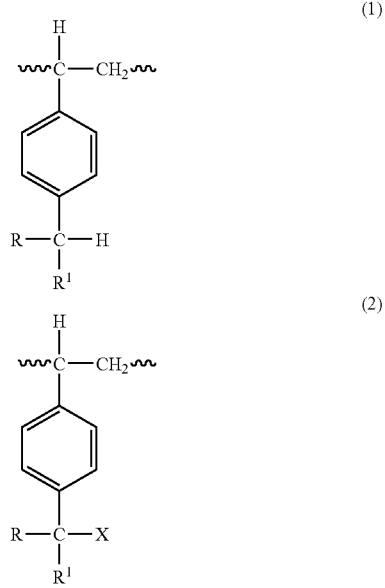

wherein R and $R^1$ are independently hydrogen, lower alkyl, preferably $C_1$ to $C_7$ alkyl and primary or secondary alkyl halides and X is a functional group such as halogen. Preferably R and $R^1$ are each hydrogen. Up to 60 mol % of the para-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and para-methylstyrene containing from 0.5 to 20 mol % para-methylstyrene wherein up to 60 mol % of the methyl substituent groups present on the benzyl ring contain a bromine or chlorine atom, preferably a bromine atom (para-(bromomethylstyrene)), as well as acid or ester functionalized versions thereof.

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 10% of the average para-alkylstyrene content of the polymer. Desirable interpolymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The interpolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMS polymers are brominated polymers that generally contain from 0.1 to 5% mole of bromomethylstyrene groups relative to the total amount of monomer derived units in the polymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, preferred copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mol % based on the total number of para-methylstyrene, and wherein the para-methylstyrene derived units are present from 3 wt % to 15 wt % based on the total weight of the polymer in one embodiment, and from 4 wt % to 10 wt % in another embodiment. In another embodiment, the para-(halomethylstyrene) is para-(bromomethylstyrene).

The nanocomposite of the present invention may also include a halogenated butyl rubber component, either with the interpolymer or as the only elastomer combined with the exfoliated clay. In one embodiment of the invention, the halogenated rubber component is a halogenated copolymer of a $C_4$ to $C_6$ isoolefin and a multiolefin. In another embodiment, the halogenated rubber component is a blend of a polydiene or block copolymer, and a copolymer of a $C_4$ to $C_6$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment of the brominated rubber component of the invention, a halogenated butyl rubber is used. As used herein, "halogenated butyl rubber" refers to both butyl rubber and so-called "star-branched" butyl rubber, described below. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared, by reacting a comonomer mixture, the mixture having at least (1) a $C_4$ to $C_6$ isoolefin monomer component such as isobutylene with (2) a multiolefin, or conjugated diene, monomer component. The isoolefin is in a range from 70 to 99.5 wt % by weight of the total comonomer mixture in one embodiment, and 85 to 99.5 wt % in another embodiment. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene.

The isoolefin is a $C_4$ to $C_6$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 wt % of isobutylene with 0.5 to 8 wt % isoprene, or reacting 95 to 99.5 wt % isobutylene with from 0.5 wt % to 5.0 wt % isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.2 wt %.

In another embodiment, the halogenated butyl or star-branched butyl rubber may be halogenated such that the halogenation is in the primary allylic position. This is typically achieved by such means as free radical bromination or free radical chlorination, or by such methods as secondary treatment halogenated rubbers, such as by heating the rubber, to form the allylic halogenated butyl and star-branched butyl rubber. Common methods of forming the allylic halogenated polymer are disclosed by Gardner el al. in U.S. Pat. Nos. 4,632,963; 4,649,178; 4,703,091. Thus, in one embodiment of the invention, the halogenated butyl rubber is such that the halogenated multiolefin units are primary allylic halogenated units, and wherein the primary allylic configuration is present to at least 20 mol % (relative to the total amount of halogenated multiolefin) in one embodiment, and at least 30 mol % in another embodiment. This arrangement can be described as follows (3), wherein X is a halogen, desirably chlorine or bromine, and q is at least mol % based on the total moles of halogen in one embodiment, and at least 30 mole % in another embodiment, and from 25 mol % to 90 mol % in yet another embodiment:

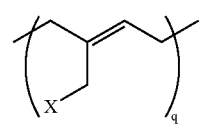

(3)

A commercial embodiment of the halogenated butyl rubber of the present invention is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 wt %. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components.

In another embodiment of the brominated rubber component of the invention, a branched or "star-branched" halogenated butyl rubber is used. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt % in one embodiment, and from 0.3 to 3 wt % in another embodiment, and from 0.4 to 2.7 wt % in yet another embodiment.

A commercial embodiment of the SBHR of the present invention is Bromobutyl 6222 (ExxonMobil Chemical Company), having a Mooney Viscosity (ML 1+8 at 125° C., ASTM 1646, modified) of from 27 to 37, and a bromine content of from 2.2 to 2.6 wt % relative to the SBHR. Further, cure characteristics of Bromobutyl 6222 are as follows: MH is from 24 to 38 dN·m, ML is from 6 to 16 dN·m (ASTM D2084, modified).

The halogenated rubber component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

Clay

Compositions of the invention include at least one interpolymer or halogenated butyl rubber as described above blended by any suitable means with at least one swellable clay, either pre-mixed with an exfoliating additive or not. Swellable layered clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$; $Ca^{+2}$, $K^+$ or $Mg^{+2}$ present at the interlayer surfaces.

The layered clay may be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^2$ is a $C_{14}$ to $C_{20}$ alkyl or alkene.

Another class of exfoliating additives include those which can be covalently bonded to the interlayer surfaces. These include polysilanes of the structure —$Si(R^5)_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

In another embodiment of the invention, improved interpolymer impermeability is achieved by the presence of at least one polyfunctional curative. An embodiment of such polyfunctional curatives can be described by the formula Z-$R^7$-Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with an embodiment of the invention is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the clay or exfoliated clay may be present from 1 to 30 phr in one embodiment, and from 5 to 20 phr in another embodiment. In one embodiment, the exfoliated clay is an alkylamine-exfoliated clay.

Secondary Rubber Component

A secondary rubber, or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney yiscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber 1is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In one embodiment of the invention, a so called semi-crystalline copolymer ("SCC") is present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Thermoplastic

The composition of this invention may optionally include a thermoplastic resin. The thermoplastic engineering resins suitable for practice of the present invention may be used singly or in combination and are resins containing nitrogen, oxygen, halogen, sulfur or other groups capable of interacting with an aromatic functional groups such as halogen or acidic groupsl. The resins are present in the nanocomposite from 30 to 90 wt % of the nanocomposite in one embodiment, and from 40 to 80 wt % in another embodiment, and from 50 to 70 wt % in yet another embodiment. In yet another embodiment, the resin is present at a level of greater than 40 wt % of the nanocomposite, and greater than 60 wt % in another embodiment.

Suitable engineering resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof, and optionally, polyolefins.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 ENCYCLOPEDIA OF CHEMICAL TECHNOLOGY 1-105 (John Wiley & Sons 1968), CONCISE ENCYCLOPEDIA OF POLYMER SCIENCE AND ENGINEERING 748-761 (John Wiley & Sons, 1990), and 10 ENCYCLOPEDIA OF POLYMER SCIENCE AND l TECHNOLOGY 392-414 (John Wiley & Sons 1969). Commercially available thermoplastic polyamides may be advantageously used in the practice of this invention, with linear crystalline polyamides having a softening point or melting point between 160 and 260° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene), $C_{2-6}$ alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexane-di-methylene) oxlate and poly-(cis-1,4-cyclohexane-di-methylene) succinate, poly ($C_{2-4}$ alkylene terephthalates) such as polyethyleneterephthalate and polytetramethylene-terephthalate, poly ($C_{2-4}$ alkylene isophthalates) such as polyethyleneisophthalate and polytetrarnethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic engineering resins which may be used in accordance with this invention are well known, commercially available materials produced by the oxidative coupling polymerization of alkyl substituted phenols. They are generally linear, amorphous polymers having a glass transition temperature in the range of 190° C. to 235° C. These polymers, their method of preparation and blends with polystyrene are further described in U.S. Pat. No. 3,383,435.

Other thermoplastic resins which may be used include the polycarbonate analogs of the polyesters described above such as segmented poly (ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one embodiment a homopolymer of propylene derived units, and in another embodiment a random copolymer or block copolymer of ethylene derived units and propylene derived units, and like engineering resins as are known in the art.

The composition of the invention may also include one or more filler components such as calcium carbonate, clay, mica, silica and silicates, talc, titanium dioxide, and carbon black. In one embodiment, the filler is carbon black or modified carbon black. The preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the components may be carried out by combining the polymer components and the clay in the form of an intercalate in any suitable mixing device such, as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

The composition of this invention may be extruded, compression molded, blow molded or, injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Thus, one embodiment of the present invention includes a nanocomposite comprising one or more clays, an interpolymer, one or more exfoliating additives, wherein the exfoliating additive(s) is an amine having the structure $R^2R^3R^4N$, wherein $R^2$, $R^3$, and $R^4$ are $C_1$ to $C_{20}$ alkyls or alkenes which may be the same or different. This composition is suitable for such articles as pneumatic tire components, especially treads, sidewalls, innerliners and innertubes. The composition is especially suitable for air barriers such as bladders, and innerliners for tires and innertubes. The composition may also comprise one or more polyfunctional curatives as described above.

Another embodiment of the interpolymer suitable for compositions of the invention may be described as a polyisobutylene interpolymer comprising from 3 wt % to 15 wt % para-methylstyrene derived units and from 0.2 mol % to 1.5 mol % para-bromomethylstyrene derived units by weight of the interpolymer.

In one embodiment of the composition or air barrier of the invention, the interpolymer is a copolymer of $C_4$ to $C_7$ isomonoolefin derived units, a para-methylstyrene derived units and a para-(halomethylstyrene) derived units, wherein the para-(halomethylstyrene) derived units are present from 0.4 to 1.5 mol % based on the total number of moles of monomer derived units incorporated into the interpolymer in one embodiment, and the para-methylstyrene is present from 3 wt % to 10 wt % by weight of the interpolymer.

In one embodiment of the composition, the exfoliating amine can be described in that at least $R^2$ is a $C_4$ to $C_{20}$ alkyl or alkene. In yet another embodiment, the exfoliating agent is selected from N,N-dimethyl-octadecylamine, N,N-dioctadecyl-methylamine, dihydrogenated tallowalkyl-methylamine, amine-terminated polytetrahydrofuran and mixtures thereof.

In yet another embodiment, the exfoliating agent is a thiosulfate compound or other compound selected from structures described by the formula Z-$R^7$-Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. In one embodiment, the thiosulfate compound is hexamethylene sodium thiosulfate.

In yet another embodiment, the one or more polyfunctional curatives, when present, are selected from structures described by the formula Z-$R^7$-Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. Examples of such structures include hexamethylene bis(sodium thiosulfate) and hexamethylene bis(cinnamaldehyde), and mixtures thereof. Thus, these "polyfunctional curatives" may serves as the exfoliating additive alone, or may serve as a curative in addition to another exfoliating additive in one embodiment of the composition.

In one embodiment, the exfoliating additive is present in the nanocomposite from 0.1 to 30 phr, and from 5 to 20 phr in another embodiment.

In another embodiment of the composition, the alkylamine-exfoliated clay is a di-methyl tallowalkyl octyl ammonia methyl sulfate-exfoliated clay; and is present in the nanocomposite from 0.3 to 20 phr in yet another embodiment. In yet another embodiment, the alkylamine-exfoliated clay is a di-methyl di-hydrogenated tallow alkyl ammonia chloride-exfoliated clay.

In another embodiment, the composition or air barrier may further comprising curing agents such as zinc, zinc stearate, stearic acid, sulfur, and mixtures thereof and other metals, metal oxides, and metal-carboxylic acid (fatty acid) complexes common in the rubber curing arts.

In yet another embodiment, the clay is pre-treated prior to blending with the interpolymer; the interpolymer, clay and exfoliating additive are added together (hence, not pre-treated) in yet another embodiment.

The following examples are illustrative of the invention.

Test Methods & Examples

Permeability Testing. All specimens were compression molded with slow cooling to provide defect free pads. A compression and curing press was used for rubber samples. Typical thickness of a compression molded pad is around 15 mil. using an Arbor press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R.A. Pasternak et. al. in 8 JOURNAL OF POLYMER SCIENCE: PART A-2 467 (1970). Disks thus prepared were mounted on a template and sealed with a vacuum grease. 10 psi nitrogen was kept on one side of the disk, whereas the other side is 10 psi oxygen. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen permeability.

Mixing BIMS with Cloisite clays and amines was performed using a Brabender™ mixer at 150° C. and 60 RPM. Curatives were added subsequently in a mill. Cloisite clays were dried overnight prior to their usage in mixing. Compositions of these mixes are listed in Table 2. Tertiary amines were added in 0.5 and 1 mole equivalent of bromine, respectively. Rubber and tertiary amines were added first for 6 minutes followed by Cloisite clay for another 5 minutes. All BIMS blends were cured to prepare pads for permeability measurement using a Mocon permeability tester. Permeability values are listed in Tables 2 through 5 for selected compositions 1A-8A, 1B-8B, 1C-8C, and 1D-4D. The data show that the addition of the tertiary amines and polyfunctional curatives improves the air impermeability of the BIMS interpolymer. In Table 4, the addition of a pre-treated clay along with a tertiary amine is shown to further improve the air impermeability of the BIMS interpolymer samples 3C and 7C. In Table 5, the addition of the treated clay and amine is shown to improve the air permeability of a BIMS interpolymer having a bromine level of 1.2 mol %.

The oxygen permeability (cc·mil/(m$^2$·day·mmHg)) of the nanocomposites of the present invention, at 40° C., range from less than 20 cc·mil/(m$^2$·day·mmHg) in one embodiment, and less than 18 cc·mil/(m$^2$·day·mmHg) in another embodiment, and less than 15 cc·mil/(m$^2$·day·mmHg) in yet another embodiment, and desirably less than 13 cc·mil/(m$^2$·day·mmHg) in yet another embodiment, and less than 10 cc·mil/(m$^2$·day·mmHg) in yet another embodiment.

Embodiments of the final nanocomposite of the present invention are useful as air barriers, such as used in producing innerliners for motor vehicles. In particular, the nanocomposites are useful in innerliners and innertubes for articles such as truck tires, bus tires, passenger automobile, motorcycle tires, off the road tires, and the like. The improved heat aging resistance of the present innerliner composition makes it particularly suited for use in truck tires to increase the retreading capability of the tire.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Material Description

| Designation | Description | Material |
|---|---|---|
| BIMS 8-94 | BIMS 89-4 rubber, 45 ML*, 0.75 mol % Br, 5 wt % PMS | EXXPRO 89-4, ExxonMobil Chemical |
| BIMS 3035 | BIMS 3035 rubber, 45 ML*, 0.48 mol % Br, 5 wt % PMS | EXXPRO Elastomers 3035, ExxonMobil Chemical |
| BIMS 3745 | BIMS 3745 rubber, 45 ML*, 1.2 mol % Br, 7.5 wt % PMS | EXXPRO Elastomers 3745, ExxonMobil Chemical |
| DM16D | Tertiary amine, hexadecyl-dimethylamine | Armeen DM16D, Akzo Nobel Chemical |
| M2HT | Tertiary amine, dihydrogenated tallowalkyl-methylamine** | Armeen M2HT, Akzo Nobel Chemical |
| 6A | Montmorillonite clay treated with di-methyl di-hydrogenated tallow alkyl ammonia chloride | Cloisite 6A, Southern Clay |
| Na | Montmorillonite clay with Na counter ions | Cloisite Na, Southern Clay |
| HTS | Hexamethylene bisthio-sulfate disodium salt | Flexsys Duralink HTS |
| Acetylene Black | Carbon Black | e.g., Harwick Standard; R.T. Vanderbilt; Degussa-Huls. |
| THF-N | Amine terminated polytetrahydrofuran | Aldrich Chemical |

*ML is Mooney viscosity (1 + 8) measured at 125° C. and ~1 s$^{-1}$.
**hydrogenated tallow contains saturated 3.5% C14, 0.5% C15, 31% C16, 1% C17, 61% C18 and unsaturated 3% C18 (⅔ of the alkyl group is C18)

TABLE 2

BIMS Clays Blends with DM16D/M2HT and Na (Untreated Clay)

| Component (phr) | 1A | 2A | 3A | 4A | 5A | 6A | 7A | 8A |
|---|---|---|---|---|---|---|---|---|
| BIMS 8-94 | 200 | 200 | 200 | 200 | 180 | 180 | 180 | 180 |
| Na (Clay) | 10 | 10 | 10 | 10 | 18 | 18 | 18 | 18 |
| DM16D (t-amine) | 3.6 | 7.2 | 0 | 0 | 3.2 | 6.4 | 0 | 0 |
| M2HT (t-amine) | 0 | 0 | 7 | 14 | 0 | 0 | 6.3 | 12.6 |
| ZnO | 2 | 2 | 2 | 2 | 1.8 | 1.8 | 1.8 | 1.8 |
| Zn Stearate | 2 | 2 | 2 | 2 | 1.8 | 1.8 | 1.8 | 1.8 |
| Stearic Acid | 4 | 4 | 4 | 4 | 3.6 | 3.6 | 3.6 | 3.6 |
| Permeability (cc · mil/ (m$^2$ · day · mmHg)) | — | — | 25.1 | 26.9 | — | — | 22.3 | 25.4 |

TABLE 3

BIMS Clay Blends with HTS/THF-N

| Component (phr) | 1B | 2B | 3B | 4B | 5B | 6B | 7B | 8B |
|---|---|---|---|---|---|---|---|---|
| BIMS 3035 | 100 | 100 | 100 | 100 | 100 | 100 | 100 | 100 |
| THF-N (amine) | 0 | 0 | 0 | 0 | 0 | 0 | 1 | 1 |
| 6A (clay) | 0 | 0 | 9 | 0 | 9 | 0 | 0 | 0 |
| Na (clay) | 0 | 0 | 0 | 9 | 0 | 9 | 9 | 9 |
| Carbon Black | 30 | 30 | 30 | 30 | 30 | 30 | 30 | 30 |
| Zinc Oxide | 2 | 0 | 2 | 2 | 0 | 0 | 2 | 0 |
| Zinc Octoate | 0 | 2 | 0 | 0 | 2 | 2 | 0 | 2 |
| HTS (thiosulfate) | 1.5 | 1.5 | 1.5 | 1.5 | 1.5 | 1.5 | 1.5 | 1.5 |
| Permeability (cc · mil/ (m$^2$ · day · mmHg)) | 19.1 | 19.9 | 18.7 | 16.9 | 19.3 | 17.0 | 17.1 | 16.8 |

TABLE 4

BIMS Clays Blends with DM16D/M2HT and 6A (Treated Clay)

| Component (phr) | 1C | 2C | 3C | 4C | 5C | 6C | 7C | 8C |
|---|---|---|---|---|---|---|---|---|
| BIMS 8-94 | 200 | 200 | 200 | 200 | 180 | 180 | 180 | 180 |
| 6A (clay) | 10 | 10 | 10 | 10 | 18 | 18 | 18 | 18 |
| DM16D (amine) | 3.6 | 7.2 | 0 | 0 | 3.2 | 6.4 | 0 | 0 |
| M2HT (amine) | 0 | 0 | 7 | 14 | 0 | 0 | 6.3 | 12.6 |
| ZnO | 2 | 2 | 2 | 2 | 1.8 | 1.8 | 1.8 | 1.8 |
| Zn Stearate | 2 | 2 | 2 | 2 | 1.8 | 1.8 | 1.8 | 1.8 |
| Stearic Acid | 4 | 4 | 4 | 4 | 3.6 | 3.6 | 3.6 | 3.6 |

TABLE 4-continued

BIMS Clays Blends with DM16D/M2HT and 6A (Treated Clay)

| Component (phr) | 1C | 2C | 3C | 4C | 5C | 6C | 7C | 8C |
|---|---|---|---|---|---|---|---|---|
| Permeability (cc · mil/(m² · day · mmHg)) | 23.7 | — | 17.3 | — | — | — | 15.7 | — |

TABLE 5

BIMS/CB Compounds Containing Clays and DM16D/M2HT

| Component (phr) | 1D | 2D | 3D | 4D |
|---|---|---|---|---|
| BIMS 3745 | 100 | 100 | 100 | 100 |
| N660 (carbon black) | 60 | 60 | 60 | 60 |
| 6A (clay) | 0 | 3 | 3 | 3 |
| DM16D (amine) | 0 | 0 | 1.48 | 0 |
| M2HT (amine) | 0 | 0 | 0 | 0.96 |
| ZnO | 1 | 1 | 1 | 1 |
| MBTS | 1.25 | 1.25 | 1.25 | 1.25 |
| S | 0.5 | 0.5 | 0.5 | 0.5 |
| Stearic Acid | 1 | 1 | 1 | 1 |
| Permeability (cc · mil/(m² · day · mmHg)) | 15.85 | 15.38 | 13.68 | 12.92 |

We claim:

1. A nanocomposite comprising a nano-clay dispersed in an elastomeric matrix interpolymer, and one or more exfoliating additives; wherein the exfoliating additive is selected from the group consisting of (1) an amine having the structure $R^2R^3R^4N$, wherein $R^2$, $R^3$, and $R^4$ are $C_1$ to $C_{20}$ alkyl or alkenyl which may be the same or different, (2) an ammonium corresponding thereto, and (3) a polyfunctional amine or ammonium, where in the elastomer matrix interpolymer is selected from the group consisting of a) interpolymers of C4 to C7 isomonoolefin, a para-methylstyrene and a para(halomethylstyrene), and b) halogenated elastomers comprising C4 to C7 isomonoolefin units, multiolefin units and halogenated multiolefin units.

2. The nanocomposite of claim 1, wherein the interpolymer is a copolymer of $C_4$ to $C_7$ isomonoolefin derived units, para-methylstyrene derived units and para-(bromomethylstyrene) derived units.

3. The nanocomposite of claim 2, wherein the para-(bromomethylstyrene) derived units are present from 0.4 to 1.5 mol % in the interpolymer.

4. The nanocomposite of claim 1, wherein at least one of $R^2$, $R^3$, and $R^4$ is a $C_{14}$ to $C_{20}$ alkyl or alkenyl.

5. The nanocomposite of claim 1, wherein the exfoliating additive is selected from the group consisting of N,N-dimethyl-octadecylamine, N,N-dioctadecyl-methylamine, dihydrogenated tallowalkyl-methylamine, amine-terminated polytetrahydrofuran and mixtures thereof.

6. The nanocomposite of claim 1, further comprising at least one polyfunctional curative wherein the polyfunctional curative is selected from the group consisting of structures described by the formula Z-$R^7$-Z', wherein $R^7$ is one of a $C_1$ to $C_{15}$ saturated or unsaturated moiety, and $C_6$ to $C_{12}$ cyclic aromatic moiety; and Z and Z' are the same or different and are one of a thiosulfate group, mercapto group, groups that are capable of crosslinking, either intermolecularly or intramolecularly, aldehyde group, carboxylic acid group, peroxide group, alkenyl group, or other one or more strands of a polymer having reactive groups.

7. The nanocomposite of claim 6, wherein the curative is a thiosulfate compound.

8. The nanocomposite of claim 1, also comprising carbon black.

9. The nanocomposite of claim 1, also comprising one or more polyfunctional curatives.

10. The nanocomposite of claim 1, wherein the exfoliating additive is present in the nanocomposite from 0.1 to 2 phr.

11. The nanocomposite of claim 1, wherein the nano-clay comprises di-methyl tallowalkyl octyl ammonium methyl sulfate-exfoliated clay.

12. The nanocomposite of claim 1, wherein the nano-clay is exfoliated by the amine and the amine-exfoliated nano-clay is present in the nanocomposite from 0.2 to 15 phr.

13. The nanocomposite of claim 1, wherein the nano-clay comprises di-methyl di-hydrogenated tallow alkyl ammonium chloride-exfoliated clay.

14. The nanocomposite of claim 2, further comprising curing agents.

15. The nanocomposite of claim 14, wherein the curing agents are selected from the group consisting of zinc, zinc stearate, stearic acid, sulfur, and mixtures thereof.

16. The nanocomposite of claim 1, wherein the clay is pre-treated.

17. The nanocomposite of claim 2, also comprising a secondary rubber selected from the group consisting of natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber and mixtures thereof.

18. An innerliner comprising the nanocomposite of claim 1, wherein the elastomeric interpolymer is vulcanized.

19. An innertube comprising the nanocomposite of claim 1, wherein the elastomeric interpolymer is vulcanized.

20. A nanocomposite comprising at least one nano-clay uniformly dispersed in an elastomeric matrix comprising at least one isobutylene interpolymer comprising from 3 wt % to 15 wt % para-methylstyrene derived units and from 0.2 mol % to 1.5 mol % para-bromomethylstyrene derived units by weight of the interpolymer; one or more exfoliating additives, wherein the exfoliating additive is an amine having the structure $R^2R^3R^4N$, wherein $R^2$, $R^3$, and $R^4$ are $C_1$ to $C_{30}$ alkyls or alkenyls which may be the same or different.

21. The nanocomposite of claim 20, wherein the poly-(bromomethylstyrene) derived units are present from 0.4 to 1.5 mol % in the interpolymer.

22. The nanocomposite of claim 20, wherein the exfoliating additive is an amine having the structure $R^2R^3R^4N$, wherein $R^2$, $R^3$, and $R^4$ are $C_1$ to $C_{20}$ alkyls or alkenyl which may be the same or different, wherein at least one of $R^2$, $R^3$, and $R^4$ is a $C_{14}$ to $C_{20}$ alkyl or alkenyl.

23. The nanocomposite of claim 20, wherein the exfoliating additive is selected from the group consisting of N,N-dimethyl-octadecylamine, N,N-dioctadecyl-methylamine, dihydrogenated tallowalkyl-methylamine, amine-terminated polytetrahydrofuran and mixtures thereof.

24. The nanocomposite of claim 20, wherein the exfoliating additive is an amine having the structure $R^2R^3R^4N$, wherein $R^2$, $R^3$, and $R^4$ are $C_1$ to $C_{20}$ alkyls or alkenyl which may be the same or different.

25. The nanocomposite of claim 20, further comprising at least one polyfunctional curative for vulcanizing the interpolymer wherein the polyfunctional curative is selected from the group consisting of structures described by the formula Z-R$^7$-Z', wherein R$^7$ is one of a C$_1$ to C$_{15}$ saturated or unsaturated moiety, and C$_6$ to C$_{12}$ cyclic aromatic moiety; and Z and Z' are the same or different and are one of a thiosulfate group, mercapto group, aldehyde group, carboxylic acid group, peroxide group, alkenyl group, or other groups that are capable of crosslinking, either intermolecularly or intramolecularly, one or more strands of a polymer having reactive groups.

26. The nanocomposite of claim 20, further comprising a curative for vulcanizing the interpolymer, wherein the curative is a thiosulfate compound.

27. The nanocomposite of claim 20, also comprising carbon black.

28. The nanocomposite of claim 20, also comprising one or more polyfunctional curatives for vulcanizing the interpolymer.

29. The nanocomposite of claim 20, wherein the exfoliating additive is present in the nanocomposite from 0.1 to 20 phr.

30. The nanocomposite of claim 20, wherein the nano-clay comprises di-methyl tallowalkyl octyl ammonium methyl sulfate-exfoliated clay.

31. The nanocomposite of claim 20, wherein the nano-clay is present in the nanocomposite from 0.2 to 15 phr.

32. The nanocomposite of claim 20, wherein the nano-clay comprises di-methyl di-hydrogenated tallow alkyl ammonium chloride-exfoliated clay.

33. The nanocomposite of claim 20, wherein the interpolymer is vulcanized with one or more curing agents.

34. The nanocomposite of claim 20, further comprising a curing agent for vulcanizing the interpolymer, wherein the curing agent is selected from the group consisting of zinc, zinc stearate, stearic acid, sulfur, and mixtures thereof.

35. The nanocomposite of claim 20, also comprising a secondary rubber selected from the groups consisting of natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber, halogenated poly(isobutylene-co-p-methylstyrene) and mixtures thereof.

36. An innerliner comprising the vulcanized nanocomposite of claim 20.

37. A bladder comprising the vulcanized nanocomposite of claim 20.

38. An innertube comprising the vulcanized nanocomposite of claim 20.

39. A nanocomposite comprising a nano-clay uniformly dispersed in a butyl rubber comprising C$_4$ to C$_7$ isoolefin derived units, multiolefin derived units, and halogenated multiolefin derived units, and one or more exfoliating additives; wherein the exfoliating additive is selected from the group consisting of (1) an amine having the structure R$^2$R$^3$R$^4$N, wherein R$^2$, R$^3$, and R$^4$ are C$_1$ to C$_{20}$ alkyls or alkenyl which may be the same or different, (2) a corresponding ammonium, and (3) a polyfunctional amine or ammonium.

40. The nanocomposite of claim 39, wherein the halogenated multiolefin units are primary allylic halogenated units present to at least 20 mol %.

41. The nanocomposite of claim 39, wherein at least one of R$^2$, R$^3$, and R$^4$ is a C$_{14}$ to C$_{20}$ alkyl or alkenyl.

42. The nanocomposite of claim 39, wherein the exfoliating additive is selected from the group consisting of N,N-dimethyl-octadecylamine, N,N-dioctadecyl-methylamine, dihydrogenated tallowalkyl-methylamine, amine-terminated polytetrahydrofuran and mixtures thereof.

43. The nanocomposite of claim 39, further comprising at least one polyfunctional curative for vulcanizing the rubber selected from the group consisting of structures described by the formula Z-R$^7$-Z', wherein R$^7$ is one of a C$_1$ to C$_{15}$ saturated or unsaturated moiety, and C$_6$ to C$_{12}$ cyclic aromatic moiety; and Z and Z' are the same or different and are one of a thiosulfate group, mercapto group, aldehyde group, carboxylic acid group, peroxide group, alkenyl group, or other groups that are capable of crosslinking, either intermolecularly or intramolecularly, one or more strands of a polymer having reactive groups.

44. The nanocomposite of claim 43, wherein the curative is a thiosulfate compound.

45. The nanocomposite of claim 39, also comprising carbon black.

46. The nanocomposite of claim 39, wherein the butyl rubber is vulcanized with one or more polyfunctional curatives.

47. The nanocomposite of claim 39, wherein the exfoliating additive is present in the nanocomposite from 0.1 to 20 phr.

48. The nanocomposite of claim 39, wherein the nano-clay comprises di-methyl tallowalkyl octyl ammonium methyl sulfate-exfoliated clay.

49. The nanocomposite of claim 39, wherein the nano-clay is present in the nanocomposite from 0.2 to 15 phr.

50. The nanocomposite of claim 39, wherein the nano-clay comprises di-methyl di-hydrogenated tallow alkyl ammonium chloride-exfoliated clay.

51. The nanocomposite of claim 39, further comprising curing agents for vulcanizing the butyl rubber.

52. The nanocomposite of claim 51, wherein the curing agents are selected from the group consisting of zinc, zinc stearate, stearic acid, sulfur, and mixtures thereof.

53. The nanocomposite of claim 39, wherein the clay is pre-treated.

54. The nanocomposite of claim 39, also comprising a secondary rubber selected from the group consisting of natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber, halogenated poly(isobutylene-co-p-methylstyrene) and mixtures thereof.

55. A tire innerliner comprising the nanocomposite of claim 39 wherein the butyl rubber is vulcanized.

56. An innertube comprising the nanocomposite of claim 39 wherein the butyl rubber is vulcanized.

* * * * *